United States Patent [19]

Scott

[11] Patent Number: 4,883,319

[45] Date of Patent: Nov. 28, 1989

[54] SELF-LOCKING SPACER BUSHING

[75] Inventor: Glenn Scott, Ann Arbor, Mich.

[73] Assignee: Hoover Universal, Inc., Ann Arbor, Mich.

[21] Appl. No.: 285,653

[22] Filed: Dec. 16, 1988

[51] Int. Cl.$^4$ .............................................. B60N 1/02
[52] U.S. Cl. ........................................ 297/354; 16/2; 403/162
[58] Field of Search ............... 297/354, 355; 403/162, 403/194, 195, 243; 16/247, 273, 2; 24/142, 141

[56] References Cited

U.S. PATENT DOCUMENTS

| | | | |
|---|---|---|---|
| 3,091,795 | 6/1963 | Budwig | 16/2 |
| 4,089,496 | 5/1978 | Nizusawa | 16/2 X |
| 4,619,544 | 10/1986 | Laidley | 403/162 |
| 4,693,514 | 9/1987 | Volke | 297/355 X |
| 4,761,860 | 8/1988 | Krauss | 24/142 |

Primary Examiner—James T. McCall
Attorney, Agent, or Firm—Harness, Dickey & Pierce

[57] ABSTRACT

A bushing assembly for use in a hinge for an automotive vehicle seat assembly comprises a pair of identical interlocking sleeves, each having a pair of opposing tangs extending in an axial direction from an annular portion. Each of the tang portions has a shoulder which is radially outwardly directed and is deflectable. The shoulders on the tang portions engage corresponding recessed ledges on the interior wall of the annular portion of the opposite sleeve so as to snap fit together to form an integral bushing assembly through which a hinge pin is passed. The bushing assembly is positioned around the hinge pin and between the hinge pin and the frame members of the vehicle seat assembly to allow rotation of the upright back of the seat. The sleeves may also be stacked together such that each of the tang portions snap into engagement with the annular portions of the adjacent sleeve to form a flexible bushing assembly of variable length.

7 Claims, 4 Drawing Sheets

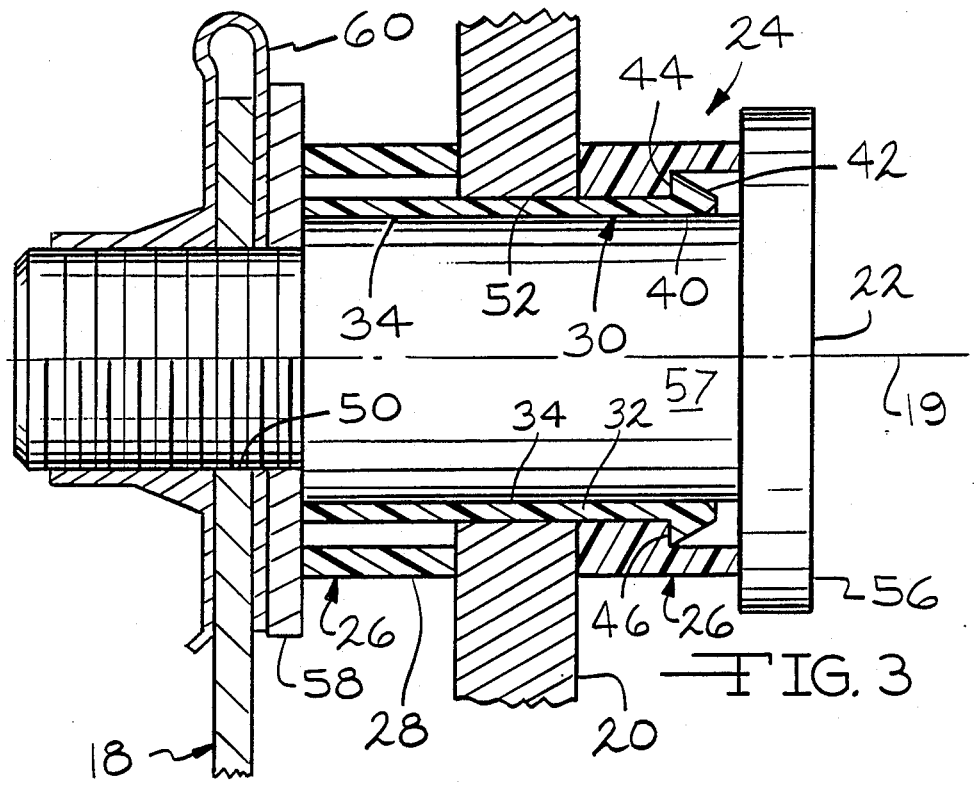
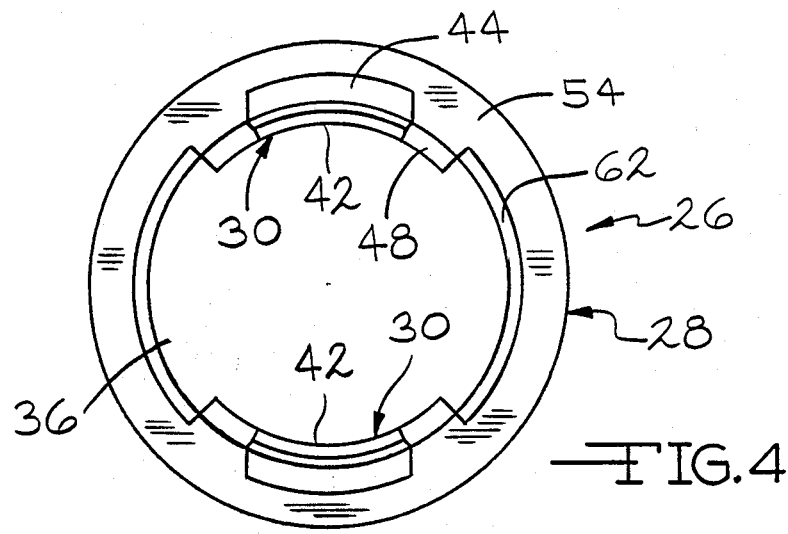

SELF-LOCKING SPACER BUSHING

BACKGROUND AND SUMMARY OF THE INVENTION

This invention relates generally to bushing assemblies and more particularly to a spacer bushing assembly for use in automotive vehicle seat assemblies.

Automotive vehicle seat hinges typically have a problem with excessive movement in a lateral direction, i.e., from side to side, as the seat back is rotated forward and backward. In conventional constructions, the pivot side of the back frame assembly in the vehicle seat is free to slide laterally over the sleeve bushing and/or hinge pin provided to connect the back to the seat. This lateral freedom often results in an undesirable squeaking noise when the back frame slides on the hinge pin.

The present invention eliminates this undesirable noise by capturing the back frame at the hinge allowing minimal lateral motion. The bushing in turn is held together by interlocking shoulders on the bushing itself in addition to being laterally held in place by the pivot pin inserted through the bushing.

The bushing assembly according to the present invention is a plastic assembly designed for use in the vehicle seat assembly having a generally horizontal seat frame and a generally upright back frame, and a pair of hinges connecting the back frame to the seat frame. Each hinge has a hinge pin aligned on a central axis. The hinge pin is secured to the seat frame and the back frame is pivotally supported on the hinge pin to allow pivotable movement of the back frame about the axis of the pin. The bushing assembly according to the present invention is mounted on the hinge pin so as to pivotally support the back frame member and maintain it in a predetermined position spaced from the seat frame member.

The bushing assembly includes a pair of interlocking plastic sleeves each having an annular portion forming a bore therethrough centered on the axis and a pair of opposing tang portions extending axially along the bore from the annular portion. At the distal end of each of the tang portions, a retaining shoulder projects outward radially from the tang. This projection is designed to interlock with a recessed ledge in the annular portion of the other sleeve when the pair of sleeves are inserted one within the other. These projections snap fit onto the corresponding ledges and form a smooth bore through the center of the interlocked sleeves for passage of the hinge pin.

Each of the back frame members has an elongated end having a hinge bore therethrough for passage of the hinge pin. The bushing assembly is assembled by passing the tang portions through the hinge bore and snapping the assembly together sandwiching the back frame member between the annular portions. The opposing faces of the annular portions of the interlocked sleeves provide shoulders on either side of the upright back frame member. The annular portions provide a spacer between the assembled seat and back frame members to limit lateral movement of the frame member at the hinge. Limiting this side to side axial movement of the frame members when the frame members are connected by the hinge in accordance with the present invention precludes undesirable noise generation.

One preferred embodiment of the present invention includes identical sleeves which sandwich the upright back frame member in a centered position between the ends of the sleeves and space the back frame member from the seat frame member. In an alternative embodiment of the present invention, the sleeves have tangs and annular portions of differing lengths proportionately so as to offset the frame members on the bushing assembly.

Another alternative embodiment of the present invention includes a plurality of the plastic sleeves stacked together with the tang portions pointing in the same direction so that the tang portions of one sleeve engage the annular portion of the adjacent sleeve so as to form a series of sleeves snapped together to form a flexible bushing assembly. The length of the assembly can be varied by snapping a number of the sleeves together.

Other features, benefits and advantages of the present invention will become apparent to those skilled in the art to which this invention pertains from the following detailed description and appended claims when taken in conjunction with the accompanying drawings.

BRIEF DESCRIPTION OF THE DRAWINGS

FIG. 3 is an enlarged partial sectional view of the assembled hinge assembly shown in FIG. 1;

FIG. 4 is an end view of the spacer bushing according to the present invention taken along line 4—4 in FIG. 2;

DETAILED DESCRIPTION OF THE PREFERRED EMBODIMENTS

Figure 1:
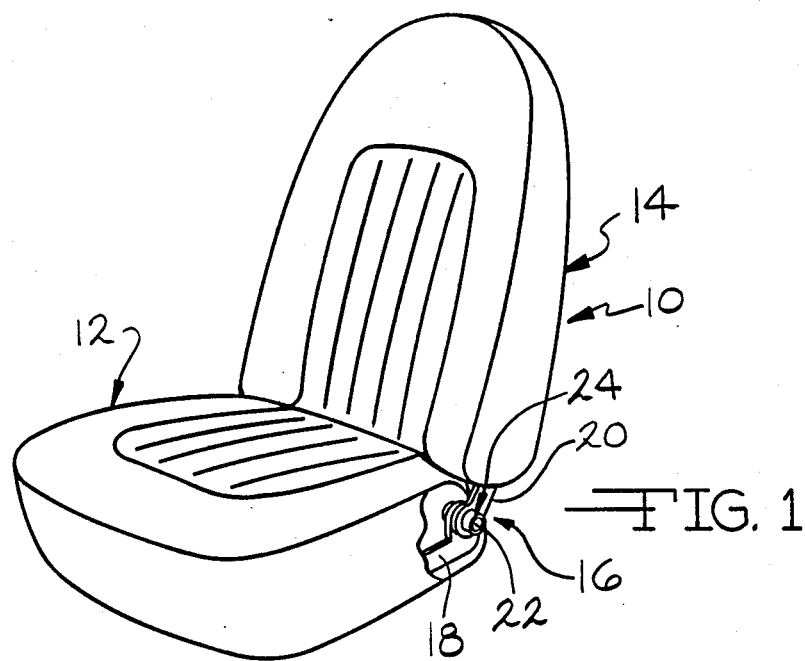
FIG. 1 is a perspective view of a vehicle seat with portions broken away to show the hinge using the bushing assembly according to the present invention.

A vehicle seat assembly 10 which has a generally horizontal seat 12 and an upright back 14 as shown in FIG. 1. Seat 12 is connected to back 14 by a hinge assembly 16 so that the back 14 can be pivoted about the hinge 16 and folded over the seat 12 to allow access behind the vehicle seat 10. In FIG. 1, only one hinge 16 is revealed for illustrative purposes. An identical hinge is on the other side of the vehicle seat assembly 10.

The hinge assembly 16 connects a generally horizontal seat frame member 18 to an upright back frame member 20 and consists principally of a hinge pin or bolt 22 which passes along axis 19 through aligned holes 50 and 52 in the frame members 18 and 20, respectively. The hinge pin 22 is fastened to frame member 18. Positioned around hinge pin 22 between hinge pin 22 and frame member 20 separating frame members 18 and 20 is a self-locking spacer bushing assembly 24 in accordance with the present invention.

Figure 2:
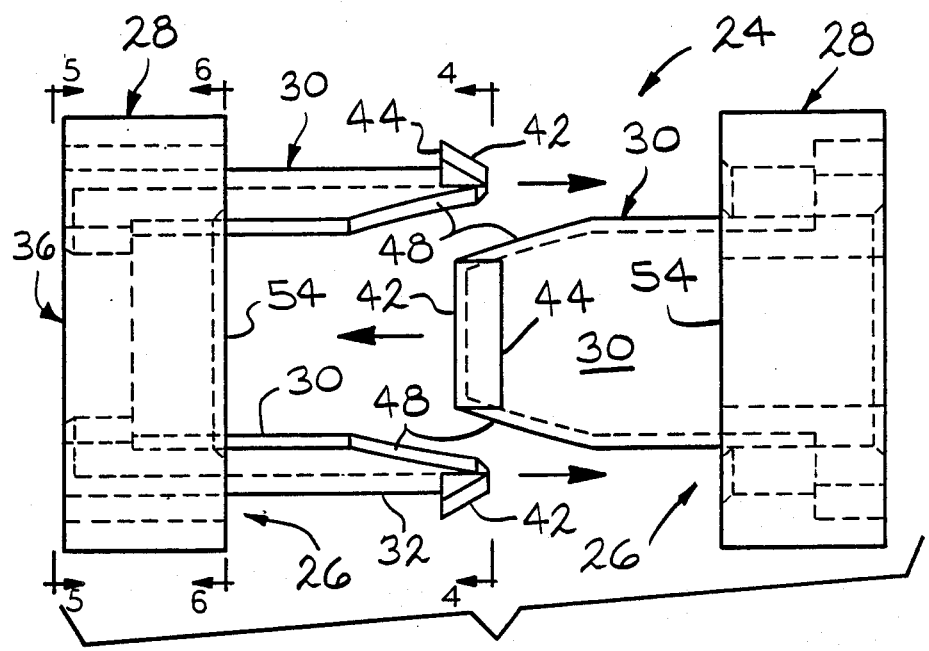
FIG. 2 is an enlarged exploded view of the spacer bushing assembly according to the present invention.
Figure 5:
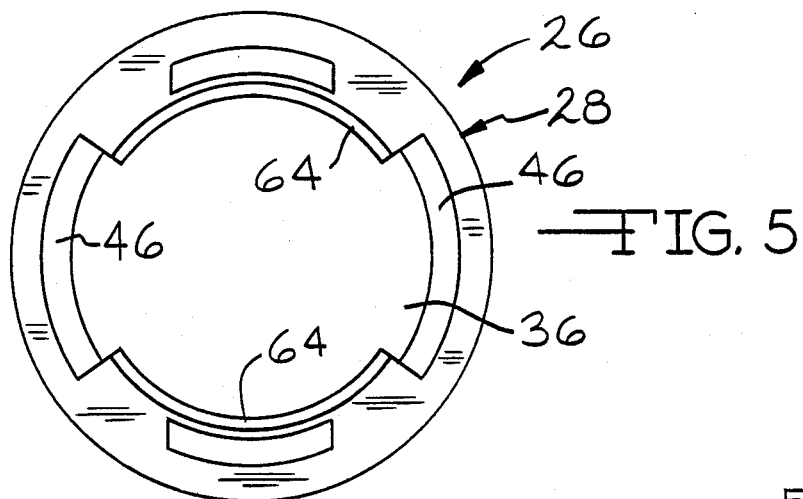
FIG. 5 is an end view of the spacer bushing according to the present invention taken along line 5—5 in FIG. 2.

One preferred embodiment of the bushing assembly 24 according to the present invention is illustrated in an exploded side view in FIG. 2. Bushing assembly 24 comprises a pair of identical bushing sleeves 26 which each have an annular portion 28 and at least one tang portion 30. Shown in FIGS. 2 through 6, each sleeve member 26 includes a pair of opposing tang portions 30.

Other embodiments are envisioned as within the scope of the present invention which may include any number of tangs within the limitations of plastic fabrication technology. Thus, the illustration of two opposing tang portions 30 is merely illustrative and is not deemed to limit the scope of the present invention.

Figure 6:
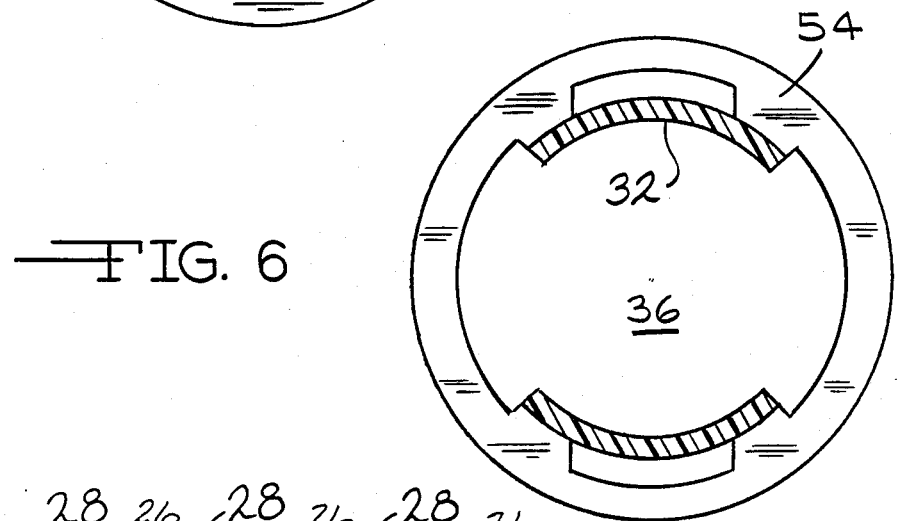
FIG. 6 is a sectional view of the spacer bushing taken along line 6—6 in FIG. 2.

Each of the tang portions 30 comprises a relatively thin sleeve body 32 which has a curved surface in cross section as shown in FIG. 6. The body 32 of each tang 30 extends axially along the inner margin 34 of annular portion 28 forming a portion of a central bore 36 through which the hinge pin bolt 22 is inserted as shown in FIG. 3.

At the distal end 40 of each tang portion 30 is a radially outwardly directed wedge shaped projection 42 having a radially planar shoulder 44. The shoulder 44 of the projection 42 engages with an interior ledge 46 of the annular portion 28 as will be subsequently described. In addition, the distal ends 40 of the tang portions 30 each have a bevel edge 48 on either side of distal end 40 to facilitate insertion of the sleeves 26 within each other to the interlocked position as shown in FIG. 3.

The tang portions 30 are deflectable. The tangs 30 deflect allowing the bushing sleeves 26 to be inserted together and through the hole 52 in the back frame member. When tangs 30 are fully inserted into the annular portion 28 of the other sleeve 26, the projections 42 snap over the ledges 46 to lock the pair of sleeves 26 together and present a straight circular bore 36 for receiving hinge pin bolt 22.

The bushing sleeves must be joined together before the hinge pin 22 is inserted through bore 36. Thus, as seen in FIG. 3, hinge pin 22 prevents disengagement of the shoulders 44 on the projections 42 from ledges 46.

The assembled bushing assembly 24 sandwiches frame member 20 by a face 54 on each annular portion 28 of each sleeve 26 butting against the opposite sides of frame member 20. The bushing assembly 24 is in turn sandwiched between frame member 18 and the head of hinge pin 22. The bushing assembly 24 thus spaces members 18 and 20 axially from one another and prevents transverse axial movement of frame member 20 on hinge pin 22. This minimizes noise generation in the hinge assembly as seat back 14 is folded forward or rearward. The bushing assembly 24 also provides a thrust bearing members 18 and 20 to absorb axial loads.

The bushing assembly 24 is made of a plastic material such as nylon and may be preferably formed by an injection molding process. As the sleeves 26 are relatively thin, the bushing assembly 24 cannot carry a substantial radial load. Accordingly, the radial bearing load on hinge 16 is carried between members 18 and 20 by hinge pin 22 mounted to frame member 18.

Hinge pin 22 has a cylindrical body with preferably a generally flat head 56 at one end and, in the embodiment shown in FIG. 3, a threaded portion at the other end, and a cylindrical shank 57 in betweenfor receiving bushing assembly 24. The threaded portion is screwed into a spring clip nut 60 which is mounted on frame member 18. A flat washer 58 on the threaded end spaces shank 57 from frame member 18 when the hinge pin 22 is tightened. The length of shank 57 is such as to allow free rotation of bushing assembly 24 about shank 57. Other means of securing hinge pins may also be used and are visualized as being within the scope of this invention such as a pin having a snap ring retainer arrangement at one or both ends.

Assembly of hinge 16 includes installing the spring clip nut 60 onto frame member 18 in alignment with hole 50. The bushing assembly 24 is then assembled onto the frame member 20 by pushing one of the bushing sleeves 26 through the hole 52 from one side and inserting another sleeve 26 from the other side of hole 52 so that the tangs 30 interfit, as shown in FIGS. 2 and 3, until projections 42 of one sleeve 26 snap fit into engagement with the recessed ledges 46 on the other sleeve 26. The engagement of the shoulders 44 of projections 42 against ledges 46 holds the bushing assembly 24 firmly in place. In addition, the assembled bushing 24 on back foam member 20 insures proper clearance relation between the back and seat when the hinge pin 22 is installed and tightened into spring clip nut 60.

The annular portion 28 of each sleeve 26 includes a chamfer 62 on the face 54 adjacent inner margin 34 to guide insertion of the projections 42 on the tangs 30 during assembly. As shown in FIG. 4, the chamfer 62 is located between the tangs 30. An additional chamfer 64 is located on the inner margin 34 at the other end of the annular portion 28 to guide the insertion of the hinge pin 22.

The hinge pin 22 is then inserted from one end through bore 36 and the flat washer 58 installed on the threaded portion end of hinge pin 22. Finally, the threaded portion of hinge pin 22 is passed through the hole 50 and screwed into the spring clip nut 60 to secure the hinge pin 22 to the frame member 18 completing the assembly of hinge 16.

The assembled plastic bushing assembly 24 provides a low coefficient of friction on radial and axial bearing surfces for relative movement of frame member 20 about axis 19. The bushing assembly 24 also maintains frame members 18 and 20 in spaced lateral alignment by the contact between the annular portions 28 of the interlocked bushing sleeves 26 and the washer 58 on one end and the hinge pin head 56 at the other. This eliminates side to side movement of the frame members and enhances smooth, quiet movement of back 14 relative to seat 12.

Sleeves 26 are identical in the embodiments of FIGS. 2 and 3. This embodiment has a particular advantage in that the sleeves are interchangeable. Therefore, it is almost impossible to misassemble the bushing assembly 24 onto the back frame member 20. This feature speeds the assembly process as well as reducing the proclivity for errors and accordingly, production costs.

Figure 7:
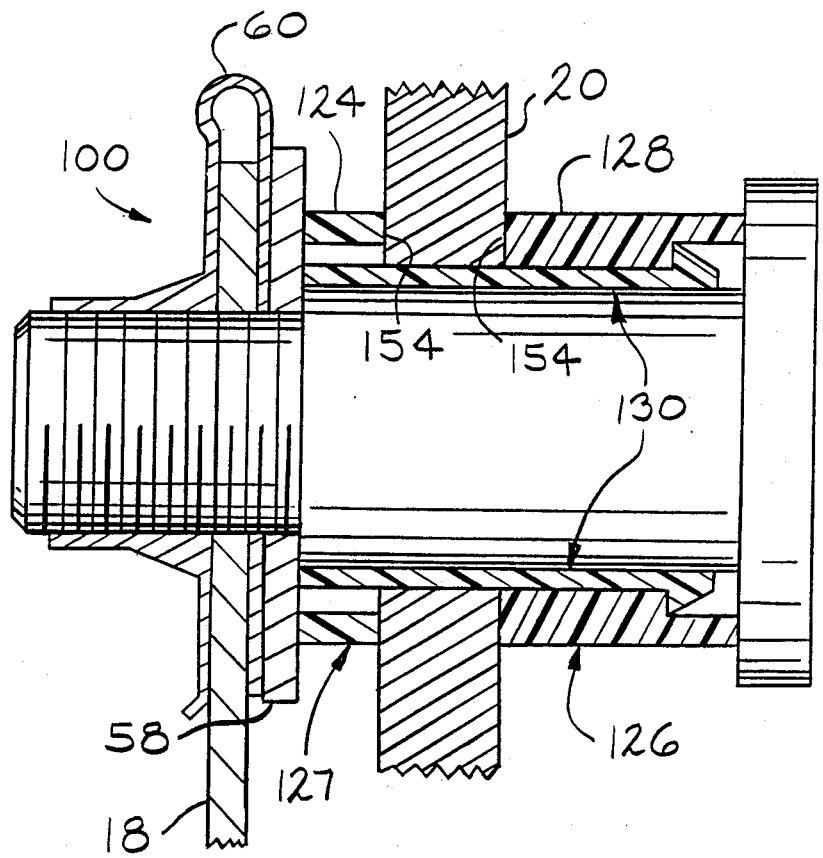
FIG. 7 is a partial sectional view of an assembled hinge similar to FIG. 3 having an alternative embodiment of the spacer bushing according to the present invention included therein.

An alternative preferred embodiment of the present invention is shown in FIG. 7. Bushing assembly 100 comprises a pair of sleeve members 126 and 127 as in FIG. 2 except that the length dimensions of the annular portions 128 and 129 and the tang portions 130 differ in a complementary relationship. The width of the annular portion 128 of one sleeve 126 is greater than the width of annular portion 129 of the other sleeve 127 and, correspondingly, the tang portion 130 of the other sleeve member 127 is longer than the corresponding tang member of the sleeve member 126 so that when interlocked together, the faces 154 of the annular portions 128 and 129 position the frame members 18 and 20 asymmetrically with respect to the bushing assembly 100 as a whole.

This configuration may be desirable in a seat hinge designs where a minimum projection of the hinge pin on one side of the hinge assembly is desired. In this case, the two interlocking bushing sleeve members are not identical but must be installed in matched pairs. In all other respects, the bushing assembly of the alternate embodiment is as described and shown in FIGS. 2 through 6.

Figure 8:
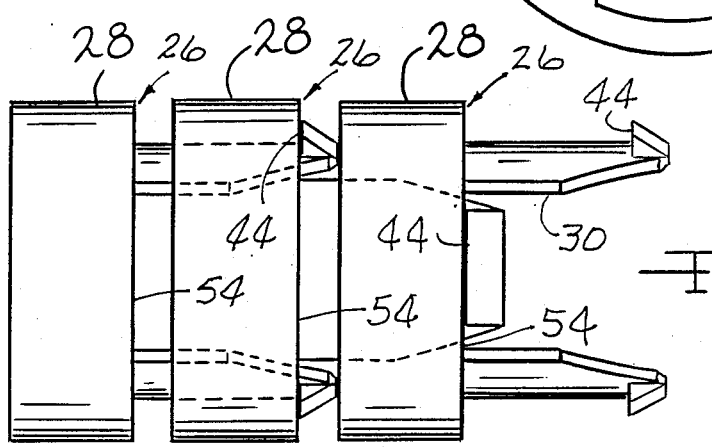
FIG. 8 is a side view of an alternative arrangement of several of the bushing sleeves according to the present invention stacked together to form a variable length sleeve bushing assembly.

An alternative use of the preferred embodiment of the invention of FIGS. 2 and 3 is shown in FIG. 8. A flexible bushing assembly 200 of variable length is formed by stacking a plurality of bushing sleeves 26 together. The assembly 200 is formed by reversing the right hand bushing sleeve 26 shown in FIG. 2 so that the sleeves 26 face the same direction. The tangs 30 are then inserted through the adjacent annular portion 28 of the adjacent sleeve 26. The tangs 30 project through bore 36 in the adjacent sleeve 26 so that shoulders 44 of one sleeve 26 engage the face 54 of the adjacent sleeve 26. The bushing assembly 200 may be used around a cable or flexible rod as a sleeve bushing to provide abrasion protection or act as a guide sleeve in a variety of applications.

Although the invention has been described by making detailed reference to a preferred embodiment and some modifications, such detail is to be understood in an instructive rather than in any restrictive sense. Many variations are possible and are considered to be within the scope of the claims.

What is claimed is:

1. In a vehicle seat assembly having a generally horizontal seat frame member and a generally upright back frame member, means including a hinge pin connecting said back frame member to said seat frame member to enable pivotal movement of one frame member about a pivot axis relative to the other frame member, a bushing assembly telescoped over said hinge pin, said bushing assembly comprising:
   a pair of coaxial sleeve members each having an annular portion forming a bore therethrough centered on said axis and at least one tang portion extending axially along said bore from said annular portion;
   retaining means on each of said tang portions of each one of said pair of sleeve members for engaging said annular portion of the other one of said pair of sleeve members to interlock said sleeve members together; and
   shoulder means on each of said annular portions engageable with said one of said frame members for maintaining said one frame member in a position between said annular portions of said sleeve members to limit relative movement of said frame members when said frame members are connected by said hinge pin passing through said bore.

2. The assembly according to claim 1 wherein said sleeve members are substantially identical.

3. The assembly according to claim 1 wherein each of said sleeve members has a pair of deflectable opposing tang portions.

4. In a vehicle seat assembly having a generally horizontal seat frame member and a generally upright back frame member, and at least one hinge connecting said back frame member to said seat frame member, said hinge having a hinge pin on an axis, said pin passing through said frame members allowing pivotable movement of said back frame member about said axis, a bushing assembly around said hinge pin and between said hinge pin and one of said frame members comprising:
   a pair of substantially identical interlocking sleeve members each having an annular portion forming a bore therethrough centered on said axis and a pair of opposing deflectable tang portions extending axially in one direction along said bore from said annular portion;
   retaining means on each one of said tang portions of each one of said pair of sleeve members for engaging said annular portion of the other of said pair of sleeve members to interlock said sleeve members together; and
   shoulder means on said annular portions engageable with said one frame member for maintaining said frame member in a spaced side by side relation to the other frame member to limit axial movement of said frame members when said frame members are connected together by said hinge pin passing through said bore.

5. The assembly according to claim 4 wherein said tangs are deflectable and said retaining means comprises a radially outwardly directed wedge shaped shoulder at the distal end of each of said tangs, said shoulder deflectably engaging an interior recessed ledge portion of the annular portion of the other sleeve member to interlock said members together, said hinge pin interfering with deflection of said tangs to prevent said shoulders from disengaging said ledge portions when said hinge pin is inserted in said bore.

6. A bushing assembly comprising:
   a pair of substantially identical interlocking sleeve members each having an annular portion having a central bore therethrough and at least one pair of deflectable tang members extending in one direction from said annular portion at locations on diametrically opposite sides of said bore, and
   retaining means on each one of said tang members engageable with said annular portion of the other of said pair of sleeve members to interlock said sleeve members together in an axially spaced relation.

7. The bushing assembly according to claim 6 wherein said retaining means comprises a radially outwardly directed wedge shaped projection at the distal end of each of said tang members, said projection having a substantially radially extending planar shoulder deflectably engageable with said annular portion of the other sleeve member to interlock said members together.

* * * * *